United States Patent [19]

Morman et al.

[11] Patent Number: 6,001,460
[45] Date of Patent: *Dec. 14, 1999

[54] ELASTIC LAMINATED FABRIC MATERIAL AND METHOD OF MAKING SAME

[75] Inventors: Michael Tod Morman, Alpharetta; Cindy Janja Milicevic, Cumming, both of Ga.

[73] Assignee: Kimberly-Clark Worldwide, Inc., Neenah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,042

[22] Filed: Dec. 30, 1996

[51] Int. Cl.⁶ ............................. B32B 3/00; B32B 27/14
[52] U.S. Cl. ..................... 428/195; 428/198; 428/200; 442/392; 442/399; 442/398
[58] Field of Search .................................. 428/195, 198, 428/200; 442/392, 399, 398

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,421,960 | 1/1969 | Arbit | 156/244 |
| 3,421,964 | 1/1969 | Arbit | 156/244 |
| 3,470,055 | 9/1969 | Wade | 156/244 |
| 3,502,538 | 3/1970 | Petersen | 161/150 |
| 3,502,763 | 3/1970 | Hartmann | 264/210 |
| 3,540,963 | 11/1970 | Dipner | 156/244 |
| 3,542,615 | 11/1970 | Dobo et al. | 156/181 |
| 3,676,242 | 7/1972 | Prentice | 156/62.4 |
| 3,690,977 | 9/1972 | Loft et al. | 156/167 |
| 3,692,618 | 9/1972 | Dorschner et al. | 161/72 |
| 3,695,967 | 10/1972 | Ross | 156/209 |
| 3,802,817 | 4/1974 | Matsuki et al. | 425/66 |
| 3,849,241 | 11/1974 | Butin et al. | 161/169 |
| 3,932,682 | 1/1976 | Loft et al. | 428/296 |
| 4,003,777 | 1/1977 | Eddy | 156/246 |
| 4,041,203 | 8/1977 | Brock et al. | 428/157 |
| 4,055,454 | 10/1977 | Laske | 156/290 |
| 4,100,324 | 7/1978 | Anderson et al. | 428/288 |
| 4,125,985 | 11/1978 | Laske | 53/452 |
| 4,166,464 | 9/1979 | Korpman | 128/287 |

(List continued on next page.)

FOREIGN PATENT DOCUMENTS

| | | |
|---|---|---|
| 0432763 | 6/1991 | European Pat. Off. ......... D04H 1/56 |
| 0707106 | 4/1996 | European Pat. Off. ....... D04H 13/00 |
| 9414607 | 7/1994 | WIPO . |
| 9420298 | 9/1994 | WIPO . |
| 9423947 | 10/1994 | WIPO . |
| 9521957 | 9/1995 | WIPO . |
| 9626697 | 9/1996 | WIPO ............................ A61F 13/15 |
| 9715442 | 5/1997 | WIPO . |
| 9723348 | 7/1997 | WIPO . |
| 9729909 | 8/1997 | WIPO . |

OTHER PUBLICATIONS

"Metallocene Catalysts Initiate new ERA in Polymer Synthesis," Ann M. Thayer, c &EN, Sep. 11, 1995, p. 15.
Kirk–Othmer, "Encyclopedia of Chemical Technology," 4th ed., vol. 10, p. 777 undated.
"Encyclopedia of Polymer Science and Engineering," Mark et al., 2nd ed., vol. 14, p. 411, undated.

*Primary Examiner*—Newton Edwards
*Assistant Examiner*—J. M. Gray
*Attorney, Agent, or Firm*—James B. Robinson

[57] ABSTRACT

A laminate material formed of an elastomeric polymer sheet and a nonwoven fabric sheet. The sheets are passed through a niproll assembly during lamination, one of the niprolls having a series of embossing points protruding therefrom, and the other niproll being substantially flat. The embossing points press selective areas of the preferably molten polymer sheet into the fabric sheet, encapsulating the fabric fibers and bonding thereto. The resulting material has points of bonding where penetration has occurred and areas of nonpenetration, providing adherence of the two sheets while permitting independent movement of the fibers and elastic properties. Preferably, a release agent is added to the elastomeric polymer to reduce the possibility of the elastomer layer sticking to the nonwoven layer when the laminate is wound onto a supply roll.

32 Claims, 4 Drawing Sheets

U.S. PATENT DOCUMENTS

| | | | |
|---|---|---|---|
| 4,209,563 | 6/1980 | Sisson | 428/288 |
| 4,300,562 | 11/1981 | Pieniak | 128/287 |
| 4,333,782 | 6/1982 | Pieniak | 156/164 |
| 4,340,563 | 7/1982 | Appel et al. | 264/518 |
| 4,374,888 | 2/1983 | Bornslaeger | 428/198 |
| 4,379,806 | 4/1983 | Korpman | 428/354 |
| 4,414,970 | 11/1983 | Berry | 128/156 |
| 4,418,123 | 11/1983 | Bunnelle et al. | 428/517 |
| 4,438,167 | 3/1984 | Shwartz | 428/138 |
| 4,443,513 | 4/1984 | Meitner et al. | 422/195 |
| 4,573,991 | 3/1986 | Pieniak et al. | 604/385 |
| 4,603,077 | 7/1986 | Fujimoto et al. | 428/289 |
| 4,657,802 | 4/1987 | Morman | 428/152 |
| 4,663,220 | 5/1987 | Wisenki et al. | 428/221 |
| 4,692,368 | 9/1987 | Taylor et al. | 428/137 |
| 4,707,398 | 11/1987 | Boggs | 428/224 |
| 4,720,415 | 1/1988 | Vander Wielen et al. | 428/152 |
| 4,724,184 | 2/1988 | Killian et al. | 428/227 |
| 4,725,473 | 2/1988 | Van Gompel et al. | 428/156 |
| 4,731,066 | 3/1988 | Korpman | 604/366 |
| 4,741,949 | 5/1988 | Morman et al. | 428/224 |
| 4,748,070 | 5/1988 | Beehler | 428/198 |
| 4,781,966 | 11/1988 | Taylor | 428/152 |
| 4,803,117 | 2/1989 | Daponte | 428/228 |
| 4,820,572 | 4/1989 | Killian et al. | 428/227 |
| 4,846,164 | 7/1989 | Martz | 128/155 |
| 4,883,549 | 11/1989 | Frost et al. | 156/161 |
| 4,886,511 | 12/1989 | Korpman | 604/365 |
| 4,923,742 | 5/1990 | Killian et al. | 428/283 |
| 4,965,122 | 10/1990 | Morman | 428/225 |
| 4,981,747 | 1/1991 | Morman | 428/198 |
| 5,108,820 | 4/1992 | Kaneko et al. | 428/198 |
| 5,114,781 | 5/1992 | Morman | 428/198 |
| 5,116,662 | 5/1992 | Morman | 428/198 |
| 5,169,706 | 12/1992 | Collier, IV et al. | 428/152 |
| 5,226,992 | 7/1993 | Morman | 156/62.4 |
| 5,304,599 | 4/1994 | Himes | 525/98 |
| 5,328,450 | 7/1994 | Smith et al. | 602/59 |
| 5,332,612 | 7/1994 | Payet et al. | 428/148 |
| 5,336,545 | 8/1994 | Morman | 428/198 |
| 5,336,552 | 8/1994 | Strack et al. | 428/224 |
| 5,382,400 | 1/1995 | Pike et al. | 264/168 |
| 5,382,461 | 1/1995 | Wu | 428/86 |
| 5,393,599 | 2/1995 | Quantrille et al. | 428/109 |
| 5,422,172 | 6/1995 | Wu | 428/230 |
| 5,466,516 | 11/1995 | Lutzow et al. | 428/198 |
| 5,529,826 | 6/1996 | Tailor et al. | 428/110 |
| 5,531,729 | 7/1996 | Coles et al. | 604/384 |
| 5,536,563 | 7/1996 | Shah et al. | 428/224 |
| 5,540,976 | 7/1996 | Shawver et al. | 428/198 |
| 5,543,206 | 8/1996 | Austin et al. | 428/198 |
| 5,567,501 | 10/1996 | Srinivasan et al. | 428/137 |
| 5,592,690 | 1/1997 | Wu | 2/67 |
| 5,593,769 | 1/1997 | Wolf et al. | 428/286 |
| 5,594,955 | 1/1997 | Sommers | 2/114 |
| 5,605,739 | 2/1997 | Stokes et al. | 428/198 |
| 5,620,780 | 4/1997 | Krueger et al. | 428/179 |
| 5,624,729 | 4/1997 | Cohen et al. | 428/90 |
| 5,634,216 | 6/1997 | Wu | 2/239 |
| 5,635,290 | 6/1997 | Stopper et al. | 428/198 |
| 5,656,119 | 8/1997 | Srinivasan | 156/290 |
| 5,683,787 | 11/1997 | Boich et al. | 428/198 |

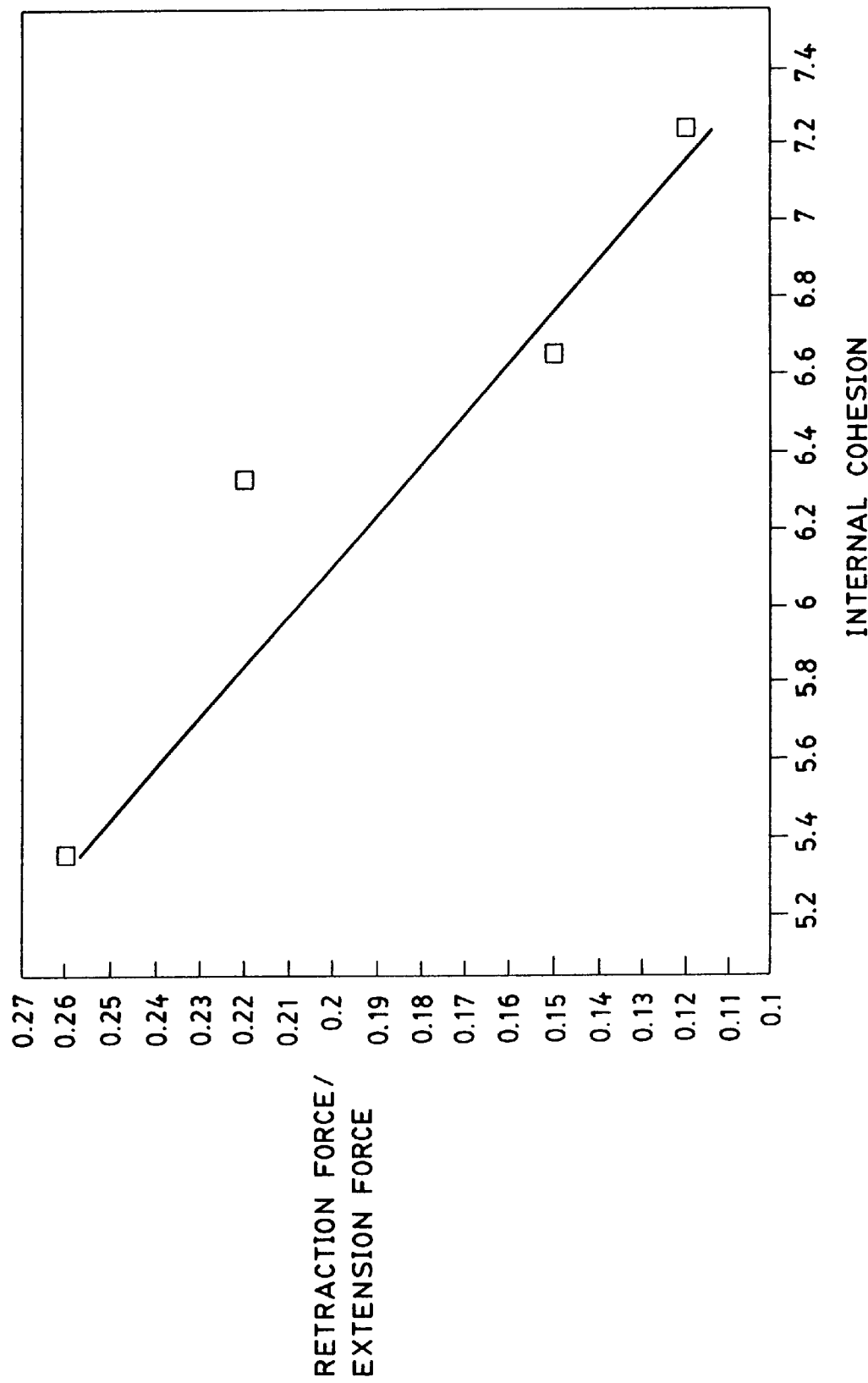

ELASTIC LAMINATED FABRIC MATERIAL AND METHOD OF MAKING SAME

FIELD OF THE INVENTION

The present invention relates to nonwoven laminated fabrics having elastic properties and methods of producing such fabrics.

BACKGROUND OF THE INVENTION

Layers of fabric material are frequently laminated or otherwise joined together to produce fabrics having desirable characteristics not fully exhibited by the layers individually. Such is the case with fabrics made of elastomeric polymers, which by themselves exhibit desirable stretch and springback properties, but are not pleasant to touch or be next to the skin for extended periods of time. Thus, techniques have been developed to make stretchable laminates with soft nonwoven fabrics, e.g., stretch bonded laminate and necked spunbond laminate technology. The present commercial processes to make these laminates places the soft facings on both top and bottom faces of the elastomeric sheet.

Bonding of two dissimilar materials requires that the two materials be adhered to one another in some manner. Where the two materials exhibit natural adhesive or attractive characteristics, bonding does not require significant specific treatment. An example of two such materials is polypropylene spunbond and KRATON® G2755 elastomer, available from Shell Chemical Company, Houston, Tex., as described hereinbelow. However, where the materials do not exhibit such attraction to each other, the molten elastomeric layer may be mechanically forced into the nonwoven material fabric structure, encapsulating the fibers, to create the bonding. Such penetration is typically achieved by passing the two layers to be laminated, usually while the elastomeric layer is still molten, through a niproll assembly comprised of two substantially flat rolls, whereby the niprolls apply even pressure across the surface of the two layers to bond the surfaces together. Bonding is achieved by the niproll pressure forcing the molten elastomeric material deep into the nonwoven fiber matrix, encapsulating the fibers. The interply attachment, as measured by the peel strength of a necked bonded laminate ("NBL"), has been found to increase as the elastomeric film polymer penetrates into the nonwoven layer. Unfortunately, the elastic properties deteriorate as this penetration is increased because fiber independence to move freely is reduced by the infusion of the encapsulating elastomer. If the nip gap is increased, elastic properties improve, but interply attachment decreases because there is less elastomer penetration into the nonwoven material and peel test performance suffers. Thus, a niproll assembly having two substantially flat rolls, while useful for many processes, can produce laminates having less than optimum qualities. What is needed is a process using a niproll assembly that would produce a laminate having sufficient bonding area while maintaining fiber independence so as to maintain desirable elasticity and peel properties. Additionally, it would be desirable to have a process and a laminate formed therefrom that would maintain the elastic properties while resulting in a soft material and laminate integrity.

It has also been frequently found useful to add a tackifier to the elastomer to increase bonding by making the elastomer stick to the nonwoven layer so penetration and encapsulation are not required. A single spunbond faced necked bonded laminate or stretch bonded laminate could be made with this tackified elastomer but the exposed elastomer face could stick to the nonwoven layer on the next wrap when it is wound into a roll and then the roll could not be unwound. It would be desirable to have an elastomer composition that would facilitate bonding, but would not cause the laminate layers to stick together during "in-roll" conditions. Also, total attachment between spunbond and tackified elastomer would reduce elasticity properties.

Accordingly, it is an object of the present invention to provide a laminated fabric having desirable elastic integrity and feel characteristics.

It is another object of the present invention to provide a laminated fabric whereby at least two layers of the laminate are point embossed together to provide selected areas of bonding and selected areas of free fiber movement.

It is a further object of the present invention to provide a laminated fabric that can be wound on a take up roll yet have reduced sticking between roll windings.

Other objects, features, and advantages of the present invention will become apparent upon reading the following detailed description of embodiments of the invention, when taken in conjunction with the accompanying drawings and the appended claims.

SUMMARY OF THE INVENTION

The present invention provides an elastic laminated fabric having at least two sheets comprising a first sheet of an elastomeric polymer and a second sheet of a preferably spunbond nonwoven fabric, whereby during lamination portions of said first sheet are selectively attached to said second sheet by point bonding. The attachment or bonding of the two layers is achieved by pushing portions of the first sheet into the fabric structure of the second sheet so that the portions of the first sheet encapsulate areas of the second sheet and bond thereto. The areas of nonpenetration preserve independent movement of fibers, thus maintaining elasticity properties, while bonded areas improve laminate peel strength. The elastomeric polymer sheet preferably contains a release agent so after the laminate has cooled and solidified, it will not stick to other surfaces, such as the spunbond faces of the next wrap on a roll.

A method of forming an elastic laminated fabric is provided comprising (a) providing first sheet; (b) providing a second sheet; and, (c) selectively bonding portions of said first sheet to said second sheet by point embossing.

BRIEF DESCRIPTION OF THE DRAWINGS

The invention is illustrated in the drawings in which like reference characters designate the same or similar parts throughout the figures of which:

FIG. 6 is a graph showing fraction force retained, as used in Example 3.

DEFINITIONS

Figure 1:
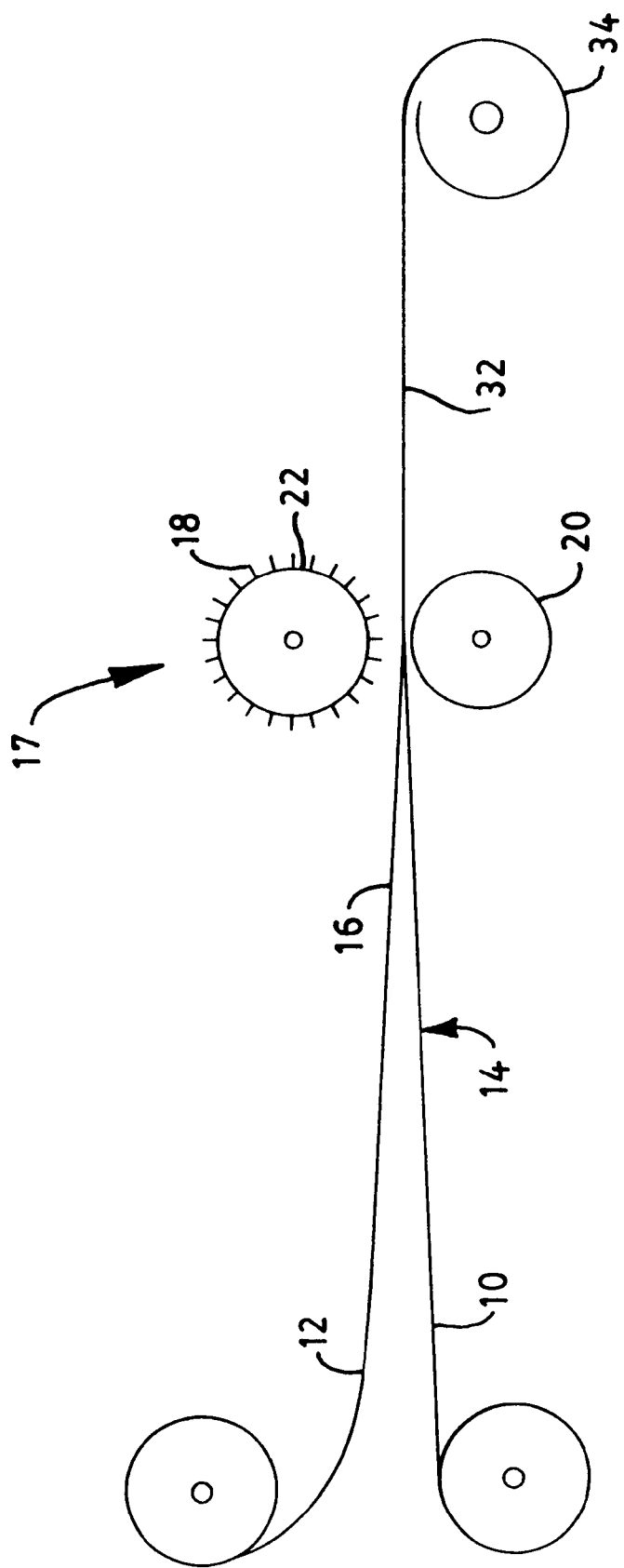
FIG. 1 is a schematic side view of an apparatus for producing the laminate of the present invention.

As used herein the term "nonwoven fabric or web" means a web having a structure of individual fibers or threads which are interlaid, but not in an identifiable manner as in a woven fabric. Nonwoven fabrics or webs have been formed by many processes such as for example, meltblowing processes, spunbonding processes, and bonded-carded-web processes. The basis weight of nonwoven fabrics is usually expressed in ounces of material per square yard (osy) or grams per square meter (gsm) and the fiber diameters useful are usually expressed in microns. (Note: to convert from osy to gsm, multiply osy by 33.91).

As used herein the term "sheet" refers to a generally flat structure, which can be composed of a nonwoven fabric or web, a woven structure, or a film, such as an elastomeric material.

As used herein the term "composite elastic material" refers to an elastic material which may be a multicomponent material or a multilayer material. For example, a multilayer material may have at least one elastic layer joined to at least one gatherable layer at least at two locations so that the gatherable layer is gathered between the locations where it is joined to the elastic layer. Such a multilayer composite elastic material may be stretched to the extent that the nonelastic material gathered between the bond locations allows the elastic material to elongate. This type of multilayer composite elastic material is disclosed, for example, by U.S. Pat. No. 4,720,415 to Vander Wielen et al.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface. Spunbond fibers are generally continuous and have average diameter larger than about 7 microns, more particularly, between about 5 and 40 microns.

As used herein the term "meltblown fibers" means fibers formed by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin. Meltblown fibers are microfibers which may be continuous or discontinuous, and generally smaller than about 100 microns in average diameter.

As used herein the term "polymer" generally includes, but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical molecular configuration of the material. These configurations include, but are not limited to isotactic, syndiotactic and atactic symmetries.

As used herein, the term "metallocene" means polyolefins produced by metallocene-catalyzed polymerization reactions. Such catalysts are reported in "Metallocene Catalysts Initiate New Era in Polymer Synthesis," Ann M. Thayer, C&EN, Sept. 11, 1995, p. 15.

As used herein, the term "machine direction" or "MD" means the length of a fabric in the direction in which it is produced. The term "cross machine direction" or "CD" means the width of fabric, i.e., a direction generally perpendicular to the MD.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g., titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other, though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another, or may be a side-by-side arrangement, or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein, the terms "necking" or "neck stretching" interchangeably refer to a method of elongating a nonwoven fabric, generally in the machine direction, to reduce its width (measured along the surface of the pre-gathered material) in a controlled manner to a desired amount. The controlled stretching may take place at room temperature or higher temperatures and is limited to an increase in overall dimension in the direction being stretched up to the elongation required to break the fabric. When relaxed, the web dimensions tend toward their original dimensions. Necking typically involves a brake niproll operating at a linear rate X and a take up niproll operating at a linear rate Y, where Y is greater than X, producing a ratio R of rates, so as to place tension on the fabric stretched therebetween. The ratio R can be about 1:1.25::X:Y, or greater or lesser. Such a process is disclosed, for example, in U.S. Pat. Nos. 4,443,513 to Meitner and Notheis, and U.S. Pat. Nos. 4,965,122; 4,981,747 and 5,114,781 to Morman.

As used herein, the term "neckable material" means any material which can be necked.

As used herein, the term "necked material" refers to any material which has been constricted in at least one dimension by processes such as, for example, drawing.

As used herein, the terms "elastic" and "elastomeric" when referring to a fiber, sheet or fabric mean a material which upon application of a biasing force, is stretchable to a stretched, biased length which is at least about 160 percent of its relaxed, unstretched length, and which will recover at least 55 percent of its elongation upon release of the stretching, biasing force within about one minute.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein the term "protective apparel" means articles including, but not limited to, surgical gowns, isolation gowns, coveralls, lab coats and the like.

As used herein the term "personal care absorbent products" means articles including, but not limited to, diapers, adult incontinence products, feminine hygiene products and garments, and child care training pants.

The term "release agent" shall mean a substance that controls or eliminates the adhesion between two surfaces.

DETAILED DESCRIPTION

The present invention provides a laminated fabric having areas of local penetration of an elastomeric layer into a fabric layer and areas of non-penetration between the layers. Also provided is a method of making the fabric.

In a preferred embodiment, shown in FIG. 1, a first layer of an elastomeric material is provided in the form of a sheet 10. The sheet 10 is preferably an elastomeric polymer selected from the group consisting of elastic polyesters, elastic polyurethanes, elastic polyamides, elastic polyolefins, metallocenes and elastic A-B-A' block copolymers, where A and A' are the same or different thermoplastic polymers, and where B is an elastomeric polymer block. A preferred polymer is KRATON® G-2755 compound, which is a blend of an elastomeric polymer, a polyolefin, and a tackifying resin. Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. For the KRATON®-type elastomers, REGALREZ™ and ARKON™ P series tackifiers are examples of hydrogenated hydrocarbon resins. ZONATAK™ 501 lite is an example of a terpene hydrocarbon. REGALREZ™ hydrocarbon resins are available from Hercules Incorporated. ARKON™ P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 20 to about 99 percent by weight elastomeric polymer, from about 5 to about 40 percent polyolefin and from about 5 to about 40 percent resin tackifier. For example, the particularly useful composition KRATON® G-2755 included, by weight, about 61 to about 65 percent KRATON® G-1659, about 17 to about 23 percent Polyethylene NA-601 (available from Quantum Chemical Co., Cincinnati, Ohio), and about 15 to about 20 percent REGALREZ® 1126. Other beneficial additives may be flow modifiers to encourage the polymer melt to penetrate into the fiber structure and surface tension modifiers to reduce elastomer melt and fiber structure surface tension differences. Flow modifiers may be added to the elastomeric polymer to reduce elastomer melt viscosity. Such a flow modifier for KRATON®-type elastomers are low molecular weight polyolefins.

For example, the elastic sheet may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 10 may be formed from, for example, (polystyrene/poly(ethylene-butylene)/polystyrene) block copolymers available from the Shell Chemical Company under the trademark KRATON® G. One such block copolymer may be, for example, KRATON® G-1659.

Other exemplary elastomeric materials which may be used to form elastic sheet include polyurethane elastomeric materials such as, for example, those available under the trademark ESTANE® from B.F. Goodrich & Co., polyamide elastomeric materials such as, for example, those available under the trademark PEBAX® from ELF Atochem Company, and polyester elastomeric materials such as, for example, those available under the trade designation HYTREL® from E.I. duPont De Nemours & Company. Formation of elastic sheets from polyester elastic materials is disclosed in, for example, U.S. Pat. No. 4,741,949 to Morman et al., hereby incorporated by reference.

A polyolefin may also be blended with the elastomeric polymer to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation PETROTHENE® NA601 (also referred to herein as PE NA601 or polyethylene NA601). Two or more of the polyolefins may be utilized. Extrudable blends of elastomeric polymers and polyolefins are disclosed in, for example, U.S. Pat. No. 4,663,220 to Wisneski et al., hereby incorporated by reference.

The elastic sheet 10 may also be a multilayer material in that it may include two or more individual coherent webs or sheets. Additionally, the elastic sheet 10 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such a composite web would be one made by a technique such as disclosed in U.S. Pat. No. 4,100,324 issued to Richard A. Anderson et al., and also incorporated herein by reference. That patent discloses a nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, hydrocolloid (hydrogel) particulates commonly referred to as super-absorbents occurs prior to collection of the fibers upon a collecting device to form a coherent web of randomly dispersed fibers.

The sheet 10 can alternatively be a film, an array of strands, a nonwoven material, foam, or the like.

The sheet 10 is formed by any of a number of conventionally known processes, including but not limited to flat die extrusion, blown film (tubular) process, casting and the like. For a general description of forming a blown film, see Kirk-Othmer, "Encyclopedia of Chemical Technology," 4th ed., Vol. 10, p. 777, which is incorporated by reference herein. A blown film may be desirable because the film molecules are oriented generally in the cross-direction, thus increasing the cross-direction strength. Normal casting of film orients the film molecules somewhat in the machine direction, thus decreasing the cross-direction strength.

For the purposes of the present discussion, the flat film extrusion formation process will be discussed as the preferred embodiment. Generally speaking, the sheet 10 may be extruded at a temperature suitable for conventional film extrusion processes for the particular elastomeric material. For example, a composition containing, by weight, about 61 to about 65 percent KRATON® G-1659, about 17 to about 23 percent Polyethylene NA-601, and about 15 to about 20 percent REGALREZ® 1126 may be extruded into an elastomeric sheet (e.g. pressure sensitive elastomer adhesive sheet) at a temperature of from about 360° to about 540° F. (about 182° C. to about 282° C.). As a further example, an elastomeric sheet may be extruded at a temperature of from about 390° to about 480° F. (about 199° C. to about 249° C.). Desirably, an elastomeric sheet may be extruded at temperatures from about 400° to about 420° F. (about 204° C. to about 215° C.).

The sheet 10 preferably contains a release agent so after the sheet 10 has cooled and solidified, it will not adhere to other surfaces, such as the spunbond faces of the next wrap on a roll. Release agents are known to those skilled in the art. Such substances are known by a variety of terms indicative of their function, including abherents, antiblocking agents, antistick agents, external or surface lubricants, parting agents and slip aids (See *Encyclopedia of Polymer Science and Engineering*, Mark et al., 2nd ed., Vol. 14, p. 411). A preferred release agent is calcium stearate, although many different classes of release agents are contemplated as being within the scope of the present invention, such as, but not limited to, ethylenebis(stearamide) (available as ACRA-WAX C™ from Glyco Chemicals, Inc.), polydimethylsiloxane emulsion (available as DOW CORNING 36 EMULSION™ from Dow Corning Corporation), silicone fluid (available as MASIL 270™ from Mazer Chemicals) and the like (Id., p. 413).

The second sheet 12 is preferably a nonwoven material. While nonwoven fabrics are preferred, knits or loosely woven fabrics can also be used in the present invention. The nonwoven material of sheet 12 can be formed by any commercially known process, including, but not limited to, carding and bonding, spunbonding, meltblowing, and the like. The material of sheet 12 may be formed by the same or different processes and made of the same or different starting materials. The fabric of this invention may be a multilayer laminate. An example of a multilayer laminate is an embodiment wherein some of the layers are spunbond and some are meltblown, such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Such a laminate may be made by sequentially depositing onto a moving forming belt first a spunbond fiber layer, then a meltblown fiber layer and last another spunbond fiber layer, and then bonding the laminate in a manner described in the aforementioned patents. Alternatively, the fabric layers may be made individually, collected in rolls, and combined in a separate bonding step. Such fabrics usually have a basis weight of from about 0.1 to about 12 osy (about 3.4 to about 400 gsm), or more particularly from about 0.75 to about 3 osy (about 25.4 to about 101.73 gsm). The abovestated processes are well known in the art and need not be reviewed herein. For the purposes of the present discussion, the preferred embodiment uses a spunbond fabric for the sheet 12. While the spunbond 12 may be unnecked, it is also possible for the spunbond 12 to be necked prior to the lamination step.

The spunbond 12 is commonly pre-formed into a supply roll and is subsequently unwound as needed. Alternatively, the laminate of the present invention can be produced whereby the spunbond 12 is formed by the desired process and immediately transferred to guide rolls and continuously advanced into the process described hereinbelow in a single step. Similarly, the elastomeric sheet 10 can be provided from a supply roll and unwound as needed.

Elastomeric thermoplastic polymers useful in the practice of this invention as the elastic layer 10 may be, but are not limited to, those made from block copolymers such as polyurethanes, copolyether esters, polyamide polyether block copolymers, ethylene vinyl acetates (EVA), block copolymers having the general formula A-B-A' or A-B like copoly(styrene/ethylene-butylene), polystyrene-poly(ethylene-propylene)-polystyrene, polystyrene-poly(ethylene-butylene)-polystyrene, (polystyrene/poly(ethylene-butylene)/polystyrene, poly(styrene/ethylene-butylene/polystyrene), metallocene-catalyzed ethylene-(butene or hexene or octene) copolymers of a density of about 0.866–0.910 g/cc and of highly stereo-regular molecular structure, A-B-A-B tetrablock copolymers, and the like.

Useful elastomeric resins include, but are not limited to, block copolymers having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated (A-B)m-X, wherein X is a polyfunctional atom or molecule and in which each (A-B)m- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly A-B-A' and A-B block copolymer, is intended to embrace all block copolymers having such rubbery blocks and thermoplastic blocks as discussed above, which can be extruded (e.g., by meltblowing or sheet forming), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. Nos. 4,663,220 and 5,304,599, hereby incorporated by reference.

Polymers composed of an elastomeric A-B-A-B tetrablock copolymer may also be used in the practice of this invention as the sheet 10 Such polymers are discussed in U.S. Pat. No. 5,332,613 to Taylor et al. In such polymers, A is a thermoplastic polymer block and B is an isoprene monomer unit hydrogenated to a substantially a poly (ethylene-propylene) monomer unit. An example of such a tetrablock copolymer is a styrene-poly(ethylene-propylene)-copolymers and formation of elastomeric nonwoven webs from those elastomeric copolymers are disclosed in, for example, U.S. Pat. No. 4,803,117.

The thermoplastic copolyester elastomers include copolyetheresters having the general formula:

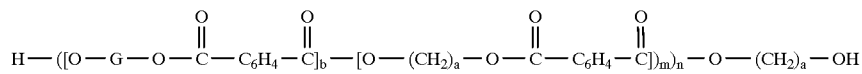

styrene-poly(ethylene-propylene) or SEPSEP elastomeric block copolymer available from the Shell Chemical Company of Houston, Tex. under the trademark KRATON®.

Other exemplary elastomeric materials which may be used include polyurethane elastomeric materials such as, for example, those available under the trademark ESTANE® from B.F. Goodrich & Co. or MORTHANE® from Morton Thiokol Corp., polyester elastomeric materials such as, for example, those available under the trade designation HYTREL® from E.I. duPont De Nemours & Company, and those known as ARNITEL®, formerly available from Akzo Plastics of Arnhem, Holland and now available from DSM of Sittard, Holland.

Another suitable material is a polyester block amide copolymer having the formula:

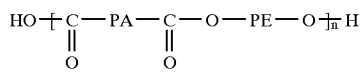

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235° C./1 Kg load); a modulus of elasticity in flexure of from about 20 Mpa to about 200 Mpa, as measured in accordance with ASTM D-790; a tensile strength at break of from about 29 Mpa to about 33 Mpa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C/1 Kg load); a modulus of elasticity in flexure of about 29.50 Mpa, as measured in accordance with ASTM D-790; a tensile strength at break of about 29 Mpa, a measured in accordance with ASTM D-639; and an elongation at break of about 650 percent as measured in accordance with ASTM D-638. Such materials are available in various grades under the trade designation PEBAX® from ELF Atochem Inc., Philadelphia, Pa. Examples of the use of such polymers may be found in U.S. Pat. Nos. 4,724,184, 4,820,572 and 4,923,742 hereby incorporated by reference, to Killian et al. and assigned to the same assignee as this invention.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

where "G" is selected from the group consisting of poly (oxyethylene)-alpha,omega-diol, poly(oxypropylene)-alpha, omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176 to 205° C.) when measured in accordance with ASTM D-2117.

Commercial examples of such copolyester materials are, for example, those known as ARNITEL®, formerly available from Akzo Plastics of Arnhem, Holland and now available from DSM of Sittard, Holland, or those known as HYTREL® which are available from E.I. duPont de Nemours of Wilmington, Del. Formation of an elastomeric nonwoven web from polyester elastomeric materials is disclosed in, for example, U.S. Pat. No. 4,741,949 to Morman et al. and U.S. Pat. No. 4,707,398 to Boggs, hereby incorporated by reference.

The neckable spunbond 12 may be made of fiber forming polymers such as, for example, nylons, polyesters and polyolefins. Exemplary polyolefins include one or more of polypropylene, polyethylene, ethylene copolymers, propylene copolymers, and butene copolymers. Useful polypropylenes include, for example, polypropylene available from the Montell North America Corporation, Wilmington, Del., under the trade designation PF-301, polypropylene available from the Exxon Chemical Company under the trade designation Exxon 3445, and polypropylene available from the Shell Chemical Company under the trade designation DX 5A09.

The sheet 12 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

The extruded, or otherwise formed, preferably still somewhat molten, sheet 10 is deposited into the contact zone 14 so that the sheets 10 and 12 immediately contact each other. The resulting multilayer material 16 is introduced into a nip pressure roll arrangement 17. The pressure roll arrangement 17 may include at least a first pressure roll 18 and a second pressure roll 20 which can be set to define a controlled gap between the rolls. Desirably, one or both of the rolls 18 and 20 may be chilled, which is believed to help cool the molten polymer sheet 10 so it more rapidly sets in bonding contact with the spunbond 12.

Figure 2:
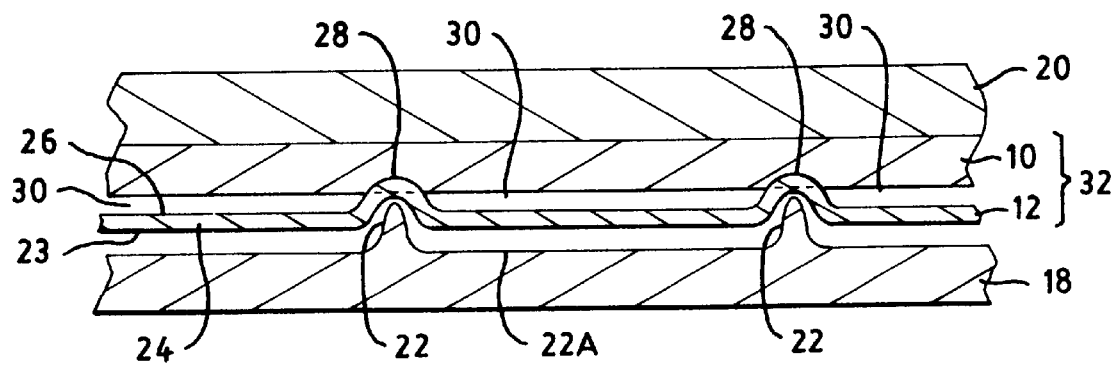
FIG. 2 is a detail view of a portion of the laminate produced according to the present invention.

The first pressure roll 18 has a plurality of spaced apart protrusions 22 on its surface 22A, as shown in FIG. 2. The protrusions 22 are preferably points commonly known as embossing points. The protrusions 22 contact the backside 23 of the nonwoven sheet 12 and selectively force elastomer 10 into the fiber structure 24 of the front face 26 of the sheet 12, encapsulating and bonding to the fibers 24, at bond points 28 as shown in FIG. 2. In the nonpenetration areas 30 between these bond points 28 the sheet 10 and necked spunbond nonwoven 12 are not bonded to each other and can move independently with respect to each other. The laminate material 32 which exits the pressure roll arrangement 17, as shown in FIG. 1, is now a unitary structure. The laminate 32 can be wound on a take up roll 34 for storage, or transported for further processing. The pattern roll 18 preferably contacts the nonwoven sheet 12, rather than the elastomer sheet 10, so as to prevent the molten elastomer material from adhering to the protrusions 22 and the roll 18. It is to be understood that there may be some circumstances where it might be desirable for the pattern roll 18 to contact the elastomer sheet 10.

Figure 3:
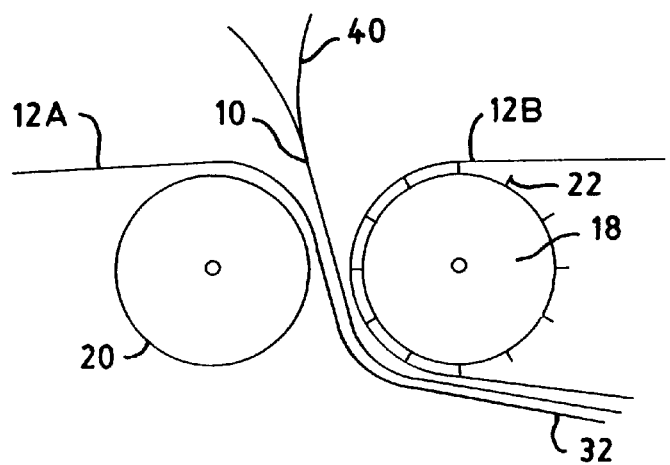
FIG. 3 is a schematic view of a detail of the apparatus of FIG. 1 showing the embossing and anvil niproll assembly.

It is to be understood that more than two layers of fabric material can be laminated together and used as the nonwoven sheet 12, such as but not limited to, a spunbond-meltblown-spunbond laminate, a spunbond-elastomer-spunbond laminate, and the like. FIG. 3 shows an alternative embodiment process in which a first spunbond layer 12A and a second spunbond layer 12B, between which is placed a molten elastomer sheet 10 cast from a die 40.

Figure 4:
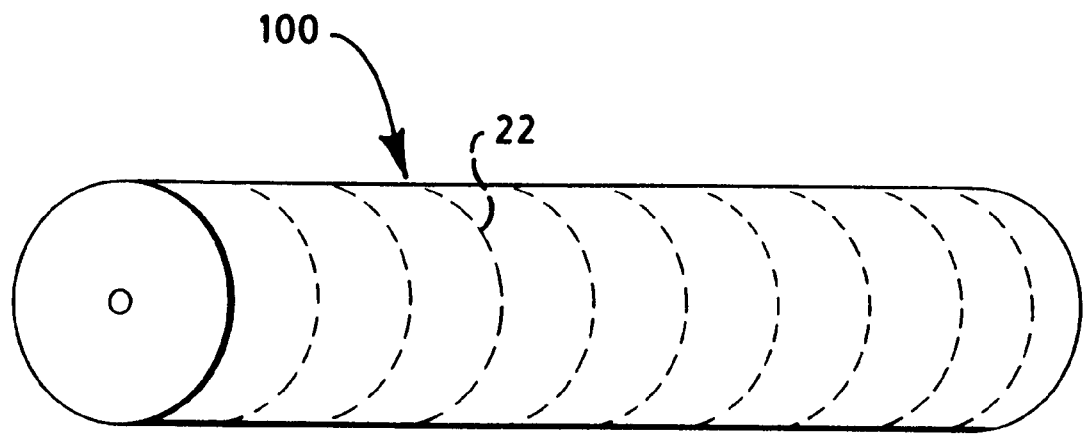
FIG. 4 shows a schematic view of an alternative embodiment of the embossing roll pattern distribution.
Figure 5:
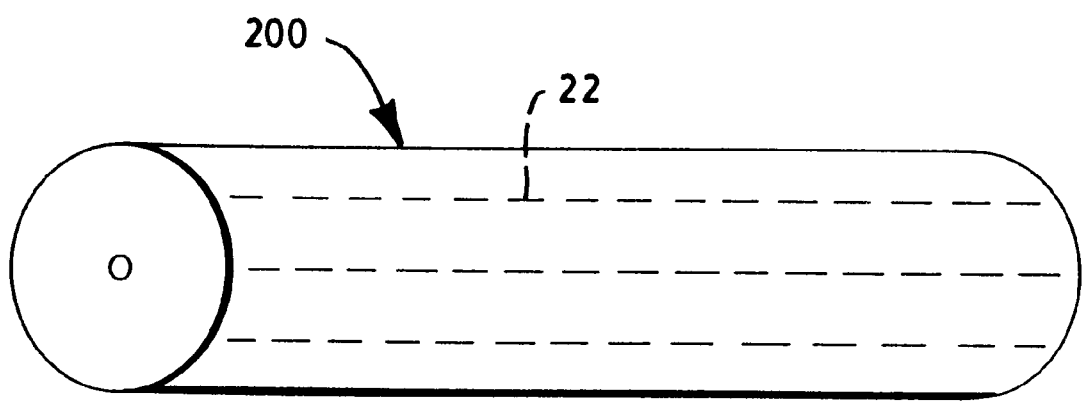
FIG. 5 shows a schematic view of a second alternative embodiment of the embossing roll pattern distribution.

The bonding characteristics are determined, in part by a number of factors, including, but not limited to, composition of the sheets 10 and 12, the presence of wetting agents, the temperature of the elastomer and spunbond material at the penetration bond points 28, the temperature of the pressure rolls 18 and 20, and the like. Additionally, the design and construction of the protrusions 22 will have an impact on bonding. Such factors include, but are not limited to, the height, geometry, density, width, and pattern of the protrusions 22, the nip roll gap, and the like. It is to be understood that the pressure roll containing the protrusions 22 can be on either side of the multilayer material 16. For NBL material, one can use niprolls 18–20 having protrusions 22 which create a line of bond points 28 in the machine direction, as shown in the pattern roll 100 in FIG. 4. This produces continuous nonpenetration lanes 30 in the machine direction of the laminate 32, which produces excellent cross direction stretch characteristics. For spunbond laminates, the line of bond points 28 could be in the cross direction, as shown in the pattern roll 200 in FIG. 5. Such bond point lines are exempletive of the flexibility and control possible with the present invention.

It is also contemplated as being within the scope of the present invention to neck the nonwoven material prior to lamination. Additionally, one can neck after lamination, such as according to the process described in copending application Ser. No. 08/730,511, entitled LAMINATED FABRIC HAVING CROSS-DIRECTIONAL ELASTICITY AND METHOD FOR MAKING SAME, filed Oct. 11, 1996, by William B. Haffner et al., and commonly assigned to the assignee of the present invention now U.S. Pat. No. 5,789,065.

The method of the present invention produces a fabric having desirable elastic characteristics because the independence of movement of the sheet 10 and the necked spunbond 12 between the bond points 28 permits stretching and recovery of the elastomer. Internal cohesion remains high as shown by peel test results. The nonwoven sheet 12 provides a facing which is soft to the touch.

The present invention can be used in personal care absorbent products as side tabs or cars on diapers, child care training pants, and the like which need to be strong and elastic, yet resistant to delamination. Another use of the fabric of the present invention is as the side pieces in adult incontinence products and feminine care pants, where elasticity and breathability are important. Additionally, the present invention can be incorporated into protective apparel.

The invention will be further described in connection with the following examples, which are set forth for purposes of illustration only. Parts and percentages appearing in such examples are by weight unless otherwise stipulated.

EXAMPLES

TEST METHODS

Peel Test. In peel or delamination testing a laminate is tested for the amount of tensile force which will pull the layers of the laminate apart. Values for peel strength are obtained using a specified width of fabric, usually 4 inches (102 mm), clamp width and a constant rate of extension. The film side of the specimen is covered with masking tape or some other suitable material in order to prevent the film from ripping apart during the test. The masking tape is on only one side of the laminate and so does not contribute to the peel strength of the sample. The sample is delaminated by hand a sufficient amount to allow it to be clamped into position. The specimen is clamped in, for example, a Sintec tensile tester, available as Sintech 2, Model 3397-139, available from Sintech Corporation, Cary, N.C., an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154, which have 3 inch (76 mm) long parallel clamps. The sample specimen is then pulled apart at 180° of separation and the tensile strength recorded in pounds or grams.

Cycling Test. The equipment used was a Constant-rate-of-extension tensile tester, designated as Sintech 2, Model 3397-139, available from Sintech Corporation, Cary, N.C. Triplicate test specimens were cut, 4.5×3 inches, the 4.5" side being in the cross-machine direction. Each 3-inch wide specimen was clamped by two pneumatic jaws so that the gauge length (jaw separation) was 2 inches, and the direction of pull was in the cross-machine direction. The pulling speed was set at 20°/min. Testing was done during two extension/retraction cycles, during which the specimen was first pulled to 100% elongation (4-inch jaw separation), the jaws then stopped and immediately returned to the starting gauge length, then another extension-retraction cycle was repeated, finally the specimen was pulled to an extension where it broke, at which time the test was stopped. Force and extension were measured by an appropriate loadcell and other sensors, data were recorded and analyzed by a computer program.

The samples tested were characterized by the load (force) measured at 30% elongation during the first cycle extension (pull) mode, and the load at 30% elongation during the second cycle retraction mode.

Internal Cohesion Test. A 2×4 inch sample of material to be tested is adhered with double-sided adhesive to a 2×4 inch metal platen (#1) to which is attached a piston. A fixed flat platen (#2) is rotated into position above the platen #1 and the platen #1 is pressed against the platen #2 for 3 seconds to secure the sample to the platen #1. The platen #2 is then rotated out of the test area. A 1×1 inch platen (#3) having a piece of double-sided adhesive mounted thereon is rotated into position above the platen #1 and the platen #1 is raised and pressed against the platen #3 for 10 seconds, adhering the sample to the two pieces of double-sided adhesive. The platen #1 is then slowly lowered. A digital force gauge, model DFI50 (available from S. A. Meier Co., Milwaukee, Wis.) is mounted on top of the platen #3. The gauge measures the peak load in kilograms needed to totally separate the sample from the double-sided adhesive.

The invention will be further described in connection with the following examples, which are set forth for purposes of illustration only. Parts and percentages appearing in such examples are by weight unless otherwise stipulated.

Example 1

A series of thermoplastic polyurethanes ("TPU") were cast from a film die between two layers of polypropylene spunbond that had been necked to 40% of their width as made on a spunbond machine. The TPU's were provided by BF Goodrich and were formulations designed to improve the adhesion of their commercial resin, available as ESTANE® 58661, to polypropylene spunbond. Three formulations were evaluated. Of the three variations on the 58661 resin, two showed improved lamination to necked polypropylene spunbond. Table 1 shows sample number and TPU formulation designation used:

TABLE 1

| Sample No. | TPU Resin Formulation |
| --- | --- |
| 1 | Modified 58661 "A" |
| 2 | Modified 58661 "B" |
| 3 | 5767 (commodity) |
| 4 | 58245 (high WVTR) |
| 5 | Modified 58245 |
| 6 | 58661 (control) |

Sample 1 and 2 resins are modifications of the current ESTANE® 58661 TPU. Sample 4 resin is a TPU designed to enhance water vapor transmission rate ("WVTR") over conventional TPU's, which had been modified by BF Goodrich to make Sample 5 to produce attachment to polypropylene spunbond. Sample 3 resin is a commodity TPU which can be purchased at lower cost than the above formulations. This resin was evaluated in modified form only, as extrusion without the modification was not possible.

A patterned piece of belting material was run through the nip assembly in order to emboss the laminates. The belting material used as the pattern roll in this Example was a flexible incline conveyor belt material available as "Neoprene Rough-Top", catalog no. 5894K78 from McMaster-Carr Supply Company, Atlanta, Ga. The belting material has a deep textural surface with raised rubber protrusions, the protrusions having relatively flat tips. More specifically, the protrusions were generally flat and rectangular in cross section at the tip, having an length of approximately 1.25 to 1.5 mm, a width of approximately 0.75 mm, and an average height of approximately 3 mm. The protrusions were arranged in rows, with the tips being approximately 3.5 mm apart within the rows and the rows being spaced approximately 6 mm apart. The geometry between the protrusion tip and the base was a number of levels of depressions, rather than a tube or cone.

Embossing was done at 0, 10, 30 and 50 psi. The samples were evaluated for peel strength, as described above. Table 2 indicates the results of the experiment.

TABLE 2

| Resin Sample No. | Nip Pressure (psi) | Peel Strength (g) | Standard Deviation |
| --- | --- | --- | --- |
| A | 0 | 538 | 287 |
|   | 10 | 756 | 165 |
|   | 30 | could not peel |   |
|   | 50 | could not peel |   |
| B | 0 | 102 | 24 |
|   | 10 | 605 | 224 |
|   | 30 | could not peel |   |
|   | 50 | could not peel |   |
| 58661 (control) | 0 | 48 | 37 |
|   | 10 | 44 | 12 |
|   | 30 | 115 | 48 |
|   | 50 | 295 | 85 |
| 58245 modified | 0 | 197 | 115 |
|   | 10 | 568 | 168 |
|   | 30 | 907 | 234 |
|   | 50 | 991 | 226 |
| 58245 | 0 | 108 | 120 |
|   | 10 | 338 | 183 |
|   | 30 | 690 | 338 |
|   | 50 | 903 | 184 |
| 5767 modified | 0 | 372 | 157 |
|   | 10 | 1049 | 121 |
|   | 30 | could not peel |   |
|   | 50 | could not peel |   |

The column labeled "nip pressure" refers to the pressure placed on the rolls at the nip point, where zero pressure indicates that the rolls were simply touching. These values are indicative of increaseing pressure rather than an actual pressure per linear inch. The results indicates that modification of the standard ESTANE® 58661 resin have resulted in improved lamination to the necked spunbond facings.

Example 2

A batch of NBL was produced with a nip gap opening of 0.075 inches and a 12 inch×12 inch piece of the material was placed in a Carver press at 115° F. at 10,000 psi (press reading) for one minute (Sample D). Sample A was prepared as for Sample D, but the press was at 20,000 psi. Sample B was prepared as for Sample D, but the press was at 5,0000 with a large dot pattern bond plate. Sample C was a control.

The three one-foot square samples and control were tested for elongation/retraction according to the cycling test procedure described above. Results of the cycling test are shown in Table 3.

TABLE 3

| SAMPLE | 30% Elongation ("E") | 30% Retraction ("R") | 30% R/30% E | Internal Cohesion (in kg) |
| --- | --- | --- | --- | --- |
| C | 889 | 230 | 0.26 | 5.336 |
| B | 915 | 204 | 0.22 | 6.33 |
| D | 1160 | 171 | 0.15 | 6.65 |
| A | 1302 | 157 | 0.12 | 7.24 |

Sample B (embossed) and Sample D had about equal internal cohesion numbers, but Sample B had much better elastic properties. Sample C had spunbond/film delamination while the others did not. FIG. 6 shows a graph of the fraction force retained (Vs internal cohesion) wherein internal cohesion data was plotted on the x-axis and retraction force/extension force ratio data was plotted on the y-axis.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

It should further be noted that any patents, applications or publications referred to herein are incorporated by reference in their entirety.

We claim:

1. An elastic laminated fabric, comprising a first sheet of an elastomeric polymer and a second sheet of fabric, whereby portions of the polymer of said first sheet are selectively attached to said second sheet by point bonding so that said polymer encapsulates fibers of said second sheet at the points of bonding and whereby said laminated fabric has an elasticity measurement of from about 0.15 to about 0.22 retraction force/extension force ratio and an internal cohesion of from about 6.3 to about 6.7 kg.

2. The fabric of claim 1, wherein said elastomeric polymer is selected from the group consisting of polyurethanes, copolyether esters, polyamide polyether block copolymers, ethylene vinyl acetates (EVA), copoly(styrene/ethylene-butylene), A-B-A' triblock copolymers, poly(styrene/ethylene-butylene/polystyrene), metallocene-catalyzed ethylene-(butene or hexene or octene) copolymers of a density of about 0.866–0.910 g/cc and of highly stereo-regular molecular structure, and A-B-A-B tetrablock copolymers.

3. The method of claim 2, wherein said A and A' blocks of said A-B-A' triblock copolymer are each a thermoplastic polymer endblock containing a styrenic moiety and wherein said B block is an elastomeric polymer midblock.

4. The method of claim 3, wherein at least one of said A and A' blocks is a poly (vinyl arene).

5. The method of claim 3, wherein said B block is selected from the group consisting of a conjugated diene and a lower alkene polymer.

6. The method of claim 2, wherein said A block of said A-B-A-B tetrablock copolymer is a thermoplastic polymer block.

7. The method of claim 2, wherein said B block of said A-B-A-B tetrablock copolymer is an isoprene monomer unit hydrogenated to a substantially poly(ethylene-propylene) monomer unit.

8. The method of claim 2, wherein said A-B-A-B tetrablock copolymer is selected from the group consisting of styrene-poly(ethylene-propylene)-styrene-poly(ethylene-propylene) and a SEPSEP elastomeric block copolymer.

9. The fabric of claim 1, wherein said second sheet is selected from the group consisting of a nonwoven material and a woven material.

10. The fabric of claim 1, wherein said second sheet is a spunbond material.

11. The fabric of claim 10, wherein said spunbond material is necked.

12. The fabric of claim 1, wherein said bonding occurs over an area of from about 5% to about 70% of said second sheet surface.

13. An elastic laminated fabric formed by the process comprising:

(a) providing a first sheet of fabric;
(b) providing a second sheet of fabric and;
(c) selectively attaching portions of said first sheet to said second sheet, wherein said attachment is achieved by pushing portions of said first sheet into the fabric structure of said second sheet so that said portions of said first sheet encapsulate areas of said second sheet and bond thereto and whereby said laminated fabric has an elasticity measurement of from about 0.15 to about 0.22 retraction force/extension force ratio and an internal cohesion of from about 6.3 to about 6.7 kg.

14. The fabric of claim 13, wherein said attachment is achieved by point embossing.

15. An elastic laminated fabric having a first sheet of an elastomeric polymer containing a release agent and a second sheet of a nonwoven material, whereby portions of said first sheet are pushed into said second sheet by point embossing during lamination, such that the resulting laminate has points of bonded areas and the remaining areas are not bonded to each other and whereby said laminated fabric has an elasticity measurement of from about 0.15 to about 0.22 retraction force/extension force ratio and an internal cohesion of from about 6.3 to about 6.7 kg.

16. The fabric of claim 1, wherein said release agent is selected from the group consisting of calcium stearate, ethylenebis(stearamide), polydimethylsiloxane emulsion, and silicone fluid.

17. A method of forming an elastic laminated fabric, comprising:

(a) providing a first sheet;
(b) providing a second sheet and;
(c) selectively bonding portions of said first sheet to said second sheet by point embossing, whereby said laminated fabric has an elasticity measurement of from about 0.15 to about 0.22 retraction force/extension force ratio and an internal cohesion of from about 6.3 to about 6.7 kg.

18. The method of claim 17, wherein said first sheet is provided in a molten form.

19. The method of claim 17, wherein said first sheet is an elastomeric polymer.

20. The method of claim 19, wherein said elastomeric polymer is selected from the group consisting of polyurethanes, copolyether esters, polyamide polyether block copolymers, ethylene vinyl acetates (EVA), copoly (styrene/ethylene-butylene), A-B-A' triblock copolymers, poly(styrene/ethylene-butylene-polystyrene), metallocene-catalyzed ethylene-(butene or hexene or octene) copolymers of a density of about 0.866–0.910 g/cc and of highly stereo-regular molecular structure. and A-B-A-B tetrablock copolymers.

21. The method of claim 20, wherein said A and A' blocks of said A-B-A' triblock copolymer are each a thermoplastic polymer endblock containing a styrenic moiety and wherein said B block is an elastomeric polymer midblock.

22. The method of claim 21, wherein at least one of said A and A' blocks is a poly (vinyl arene).

23. The method of claim 20, wherein said B block of said A-B-A' triblock copolymer is selected from the group consisting of a conjugated diene and a lower alkene polymer.

24. The method of claim 20, wherein said A block of said A-B-A-B tetrablock copolymer is a thermoplastic polymer block.

25. The method of claim 20, wherein said B block of said A-B-A-B tetrablock copolymer is an isoprene monomer unit hydrogenated to a substantially poly(ethylene-propylene) monomer unit.

26. The method of claim 20, wherein said A-B-A-B tetrablock copolymer is selected from the group consisting of styrene-poly(ethylene-propylene)-styrene-poly(ethylene-propylene) and a SEPSEP elastomeric block copolymer.

27. The method of claim 17, wherein said second sheet is formed from meltblown fibers.

28. The method of claim 17, wherein said second sheet comprises a spunbond material.

29. The method of claim 20, wherein said spunbond material is necked.

30. The method of claim 17, wherein the step of selective bonding further comprises passing said first sheet and said second sheet between a pair of first and second niprolls, said first nip roll being smooth and said second niproll having a plurality of embossing points.

31. The method of claim 17, wherein said first sheet contains a release agent.

32. The method of claim 31, wherein said release agent is selected from the group consisting of calcium stearate, ethylenebis(stearamide), polydimethylsiloxane emulsion, and silicone fluid.

* * * * *